UNITED STATES PATENT OFFICE.

KARL PATHE AND ADOLF ISRAEL, OF ELBERFELD, GERMANY, ASSIGNORS TO THE FARBENFABRIKEN, VORMALS FR. BAYER & CO., OF SAME PLACE.

BROWN AZO DYE.

SPECIFICATION forming part of Letters Patent No. 543,539, dated July 30, 1895.

Application filed April 16, 1895. Serial No. 545,953. (Specimens.) Patented in England February 6, 1894, No. 2,591; in France April 27, 1894, No. 221,233, and in Italy May 23, 1894, XXVIII, 36,270, LXXI, 134.

*To all whom it may concern:*

Be it known that we, KARL PATHE and ADOLF ISRAEL, chemists and doctors of philosophy, (assignors to the FARBENFABRIKEN, VORMALS FR. BAYER & CO., of Elberfeld,) subjects of the Emperor of Germany, residing at Elberfield, Prussia, Germany, have invented a new and useful Improvement in the Manufacture of Brown Azo Dye, (for which the aforesaid FARBENFABRIKEN have already obtained Letters Patent in France, No. 221,233, dated April 27, 1894; in Italy, XXVIII, No. 36,270, LXXI, No. 134, dated May 23, 1894, and in England, No. 2,591, dated February 6, 1894;) and we hereby declare the following to be an exact and clear description of our invention.

Our invention relates to the production of new substantive azo dyes resulting from combining one molecular proportion of diazotised dehydrothio para toluidin sulfonic acid (or dehydrothio metaxylidin sulfonic acid or dehydrothio pseudo cumidin sulfonic acid, with one molecular proportion of Clève's acids, viz: alpha$_1$ amidonaphthalene beta$_3$ sulfo acid, or alpha$_1$ amidonaphthalene beta$_4$ sulfo acid), rediazotising the thus-obtained intermediate product, allowing the so-formed diazo product to act on one molecular proportion of phenol (or the homologous cresols) and subsequently alkylating in a suitable manner the coloring-matter thus produced, which contains a hydroxy group, owing to the phenol (or cresols) used as the last component. In this manner brown substantive alkyloxy dyestuffs are obtained which are distinguished by their great fastness on exposure to the action of alkalies, acids, and light.

In carrying out our invention practically, we can, for example, proceed as follows: 34.2 parts, by weight, of the sodium salt of dehydrothio para toluidin sulfonic acid are dissolved in five hundred liters of warm water, together with 6.9 parts, by weight, of sodium nitrite. To this mixture, which is practically kept at a temperature of about 30° centigrade, thirty-five parts, by weight, of muriatic acid (20° Baumé) are gradually added under continuous stirring. After standing for about two hours the diazo compound thus obtained is introduced into a solution prepared by dissolving 24.5 parts, by weight, of alpha$_1$ amidonaphthalene beta$_3$ sulfonate of sodium, and sixty parts, by weight, of sodium acetate in water. After stirring during about twelve hours the mass is heated at about 90° centigrade, and is then rendered alkaline by means of soda-lye. The thus-formed amido azo compound (intermediate product) is salted out, filtered off, and then carefully mixed with a small quantity of water to form a thick paste. Thirteen parts, by weight, of sodium nitrite dissolved in a small quantity of water are added and the resulting liquid mixture, which is kept at from 5° to 10° centigrade, is acidulated by means of sixty parts, by weight, of muriatic acid, (20° Baumé.) The mixture is allowed to remain during twelve hours with repeated stirring. The formed diazo compound is filtered off and introduced into a solution prepared by dissolving 9.4 parts, by weight, of phenol in three hundred liters of water with the addition of 5.6 parts, by weight, of potassium hydroxid and thirty-five parts, by weight, of potassium carbonate. The mass is thoroughly stirred, and after some hours a further quantity—say, 5.6 parts, by weight, of potassium hydroxid dissolved in twenty liters of water—is added. At the end of twelve hours the mass is heated for some time at from 60° to 90° centigrade, and the hydroxy coloring-matter is salted out, filtered off, and if necessary the same is purified by redissolving in water, salting out, and filtering off again. For alkylating the thus-formed coloring-matter, the pasty mass obtained by filtration is mixed with 10.9 parts, by weight, of ethyl bromid, three hundred liters of water, three hundred liters of alcohol. After adding six parts, by weight, of potassium hydroxid, the mixture is heated by means of a water-bath during about eight hours in a closed vessel capable of withstanding pressure. In cooling the ethoxy dye-stuff separates for the most part. It is isolated by filtering off, pressing, and drying.

The complete dye-stuff has probably the following formula:

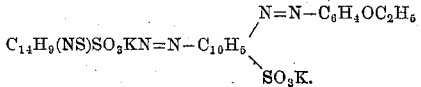

The coloring-matter when pulverized forms a reddish-brown powder, difficultly soluble in cold water, more readily soluble in hot water with a yellowish-red color. It is difficultly soluble in ammonia-liquor, insoluble in alcohol and soda-lye. By concentrated sulfuric acid (66° Baumé) the dye-stuff is dissolved with a green color, which turns into greenish blue on the addition of a small quantity of ice-water to the sulfuric-acid solution, and finally on the addition of a large quantity of ice-water the free sulfo acid of the coloring-matter is separated in the form of reddish-brown flakes. Reddish-brown flakes likewise separate if hydrochloric acid is added to the solution of the dye-stuff in water. It yields on unmordanted cotton yellowish-brown shades, which withstand the action of acids and alkalies and are distinguished for their fastness on exposure to light.

We do not limit ourselves of course to the method particularly hereinbefore set forth to produce the above-described dye-stuff, as this method can be varied. For instance, the combination of the diazo compound of dehydrothio para toluidin sulfo acid with the naphthylamin sulfo acid can also be effected in a slightly-alkaline solution.

The dehydrothio para toluidin sulfo acid may be replaced by the homologous dehydrothio metaxylidine sulfonic acid or dehydrothio pseudo cumidin sulfonic acid or primulin. Further, the alpha$_1$ amidonaphthalene beta$_4$ sulfo acid may be substituted for the alpha$_1$ amidonaphthalene beta$_3$ sulfo acid, and the phenol employed in the aforesaid example may be replaced by the homologous cresols. The alkylation can be effected in another manner. For example, methyl bromid may be used instead of ethyl bromid, methylated dyes being thus obtained.

The dyes obtainable under such varied conditions are in general analogous or similar in their dyeing and chemical properties to that which is particularly described in the above example.

It is therefore to be understood that when in this specification we refer to dehydrothio para toluidin sulfonic acid we refer likewise to dehydrothio metaxylidin sulfonic acid or to dehydrothio pseudo cumidin sulfonic acid, and when we refer to alpha$_1$ amidonaphthalene beta$_3$ sulfonic acid we refer also to alpha$_1$ amidonaphthalene beta$_4$ sulfonic acid, and when we refer to phenol we refer also to cresol.

Having now described our invention and in what manner the same is to be performed, what we claim as new, and desire to secure by Letters Patent, is—

1. The process for the production of substantive azo dyes, consisting in combining one molecular proportion of diazotized dehydrothio para toluidin sulfonic acid with one molecular proportion of alpha$_1$ amidonaphthalene beta$_3$ sulfonic acid, or an alkaline salt thereof, rediazotizing the intermediate amido azo compound, subsequently combining the so formed diazo-product with one molecular proportion of phenol, and finally converting the hydroxy groups contained in the so formed hydroxy products into an alkyloxy group, substantially as described.

2. As new articles of manufacture, the substantive dyes which may result from the alkylation of the hydrooxydisazo product obtained from dehydrothio para toluidin sulfonic acid, alpha$_1$ amidonaphthalene beta$_3$ sulfoacid, and phenol, as hereinbefore described, having in case the hydroxydisazo product from dehydrothio para toluidin sulfonic acid, alpha$_1$ amidonaphthalene beta$_3$ sulfo acid and phenol be ethylated, the following formula (in which sodium or potassium is understood by the expression "Alk"):

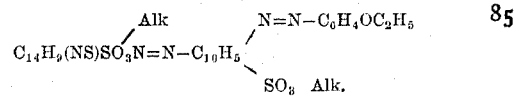

forming a reddish-brown powder difficultly soluble in cold water with a reddish-brown color and difficultly soluble in ammonia liquor, insoluble in alcohol and soda-lye, soluble in sulfuric acid (66° Baumé) with a green color which turns into greenish-blue on the addition of a small quantity of ice-water to this sulfuric acid solution, while reddish-brown flakes are precipitated on the addition of a large quantity of water producing, on unmordanted cotton, yellowish-brown shades fast to the action of light, alkali and acid, substantially as described.

In testimony whereof we have signed our names in the presence of two subscribing witnesses.

KARL PATHE.
ADOLF ISRAEL.

Witnesses:
F. H. STRAUSS,
A. STRAUSS.